United States Patent [19]

Wang et al.

[11] Patent Number: 5,283,234
[45] Date of Patent: Feb. 1, 1994

[54] SUPERCONDUCTING SHOCK ABSORBER

[75] Inventors: Xingwu Wang, 113 N. Main St., Alfred, N.Y. 14802; William F. Nichols, Campbell, N.Y.

[73] Assignee: Xingwu Wang, Alfred, N.Y.

[21] Appl. No.: 705,929

[22] Filed: May 28, 1991

Related U.S. Application Data

[63] Continuation-in-part of Ser. No. 521,909, May 11, 1990, which is a continuation-in-part of Ser. No. 392,199, Aug. 10, 1989, Pat. No. 4,960,760.

[51] Int. Cl.$^5$ .................. F16C 39/06; F16F 15/03
[52] U.S. Cl. ......................... 505/1; 188/267
[58] Field of Search ............ 188/267, 164, 158, 299; 505/1, 879, 903; 104/284, 286

[56] References Cited

U.S. PATENT DOCUMENTS

| | | | |
|---|---|---|---|
| 3,770,290 | 11/1973 | Bottalico | 188/267 |
| 4,273,054 | 6/1981 | Yamashita et al. | 104/281 |
| 4,796,511 | 1/1989 | Eyssa | 89/8 |
| 4,797,386 | 1/1989 | Gyorgy et al. | 505/1 |
| 4,813,332 | 3/1989 | Jasper, Jr. | 89/8 |
| 4,939,120 | 7/1990 | Moon et al. | 505/876 |
| 4,960,760 | 10/1990 | Wang et al. | 505/1 |
| 4,973,854 | 11/1990 | Hummel | 267/64.26 |

FOREIGN PATENT DOCUMENTS

| | | | |
|---|---|---|---|
| 0137737 | 8/1982 | Japan | 188/267 |
| 0258238 | 11/1987 | Japan | 188/267 |
| 0072233 | 3/1990 | Japan | 188/267 |

OTHER PUBLICATIONS

S. H. Autler, "Superconducting Electromagnets", The Review of Scientific Instruments, vol. 31 No. 4, Apr. 1960.

C. P. Bean and Margaret V. Doyle, "Superconductors as Permanent Magnets", Journal of Applied Physics, vol. 33 No. 11, Nov. 1962.

Francis Moon et al., "Superconductivity: As Temperatures Rise So Do Demands on MEs", (Advanced Energy Systems), Mechanical Engineering, pp. 60–68, Jun. 1988.

*Primary Examiner*—Robert J. Oberleitner
*Assistant Examiner*—Chris Schwartz
*Attorney, Agent, or Firm*—Howard J. Greenwald

[57] ABSTRACT

A contactless shock absorber assembly containing a chamber and a piston disposed therein is disclosed. The chamber is formed by alternating sections of superconductive material and electromagnetic coils; and the interior surfaces of the chamber define a symmetrical shape. The piston contains at least two magnetic sections and at least two nonmagnetic sections.

12 Claims, 1 Drawing Sheet

SUPERCONDUCTING SHOCK ABSORBER

CROSS-REFERENCE TO RELATED APPLICATIONS

This is a continuation-in-part of applicants' copending patent application Ser. No. 07/521,909, filed May 11, 1990, which in turn was a continuation-in-part of application Ser. No. 392,199, filed Aug. 10, 1989, now U.S. Pat. No. 4,960,760.

FIELD OF THE INVENTION

A shock absorber and vibration damper comprised of superconductive material which is useful in low temperature applications.

BACKGROUND OF THE INVENTION

Devices which were suitable for both absorbing shocks and damping vibration are known to those skilled in the art. Thus, by way of illustration, U.S. Pat. No. 4,973,854 of Hummel discloses a hydraulic shock-absorber and vibration damper.

To the best of applicants' knowledge, no device which adequately absorbs shocks and dampens vibrations at low temperatures is disclosed in the prior art. The hydraulic device of the Hummel patent would not be operative at low temperatures at which its hydraulic fluid would freeze.

Many devices have been invented which are comprised of one or more superconductive materials and, thus, must be operated at low temperatures, which are generally about 150 degrees centigrade below zero. Many of these low-temperature devices are sensitive to vibration. See, for example, Xingwu Wang's Ph.D. Thesis entitled "Superfluid Phase Transitions . . . ," October, 1987, available from University Microfilm International, 300 North Zeeb Road, Ann Arbor, Mich.

It is an object of this invention to provide an apparatus which, at low temperature, is comprised of means for damping mechanical vibrations in at least three separate directions;

It is another object of this invention to provide a self-regulating shock-absorber assembly which automatically will dampen vibration at low temperature.

SUMMARY OF THE INVENTION

In accordance with this invention, there is provided a shock-absorbing device which is comprised of a chamber and a piston. The chamber is formed by alternating sections of superconductive material and electromagnetic coils. The piston is comprised of a magnetically inert material and at least two magnets disposed within said material.

DESCRIPTION OF THE PREFERRED EMBODIMENTS

Figure 1:
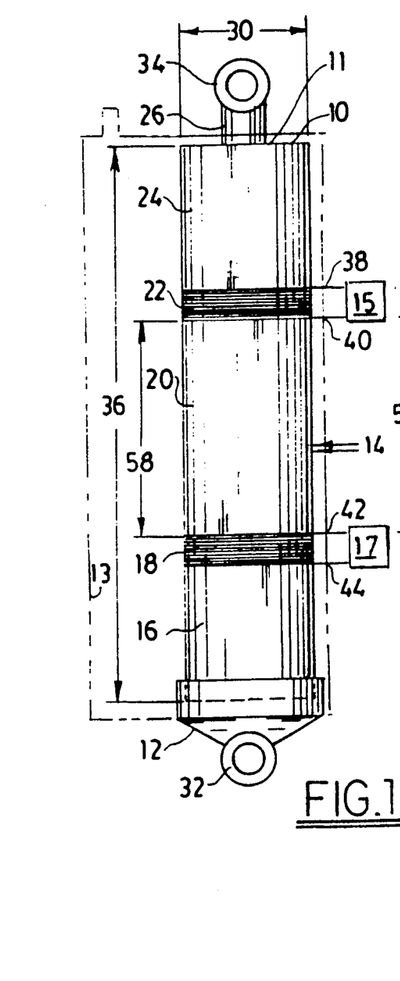
FIG. 1 is a side view of one preferred embodiment of this invention.

FIG. 1 is a side view of one preferred embodiment of applicants' invention. Referring to FIG. 1, it will be seen that shock absorber 10 is comprised of a chamber 11, a cooling means 13, and an electrical power supplies 15 and 17. This chamber 11 is similar to the chamber described in U.S. Pat. No. 4,960,760, the disclosure of which is hereby incorporated by reference into this specification.

The chamber 11 will be described below with reference to the drawings of U.S. Pat. No. 4,960,760.

FIG. 1 of U.S. Pat. No. 4,960,760 illustrates one of the preferred embodiments of applicants' chamber. Referring to such FIG. 1, it will be seen that contactless mass transfer system 10 is shown. Mass transfer system 10 is comprised of means for cooling superconducting material 12, superconducting material 14, and means for generating an electromagnetic field 16.

Any means for cooling superconducting material 12 below its critical temperature may be used in the system of U.S. Pat. No. 4,960,760. As is known to those skilled in the art, critical temperature is the temperature at which superconductivity occurs in a material. It is preferred that this temperature be no lower than about 85 degree Kelvin.

Any of the cooling means 12 known to those skilled in the art may be used in the system of U.S. Pat. No. 4,960,760. Thus, for example, one may use the cooling means described in U.S. Pat. No. 4,813,332 of Jasper, the disclosure of which is hereby incorporated by reference into this specification. By way of illustration and not limitation, suitable cooling means include liquid nitrogen, cryogenic refrigerators, compressed gas cryogenic refrigerators, and the like.

As will be apparent to those skilled in the art, the system of U.S. Pat. No. 4,960,760 may be utilized in a normally cold environment (such as outer space), in which case an auxiliary means for cooling the superconductive material might not be necessary.

In one preferred embodiment, illustrated in FIG. 1 of U.S. Pat. No. 4,960,760, liquid nitrogen is fed via line 18 through inlet 20, thereby filling chamber 22. In this embodiment, chamber 22 is concentric with superconducting material 14.

In the preferred embodiment of FIG. 1 of U.S. Pat. No. 4,960,760, it is preferred that the cooling chamber 22 be substantially contiguous with superconducting material 14 in order to maximize cooling efficiency. It is preferred that at least about 90 percent of the exterior surface of superconducting material 14 be in contact with a surface of cooling chamber 22. In this preferred embodiment, both the superconducting material 14 and chamber 22 have a substantially cylindrical cross-section, and substantially the entire outer perimeter of superconductor 14 is in contact with at least one portion of the interior perimeter of cooling chamber 22.

Cooling means 12, in addition to cooling the superconductor below its critical temperature, also preferably should cool the means 16 for generating an electromagnetic field to a temperature which may be at substantially the same temperature as the superconductor.

The superconducting material used in the chamber of this patent application and U.S. Pat. No. 4,960,760 has a critical temperature greater than about 77 degrees Kelvin. As known to those skilled in the art, Type II superconductors are characterized by first and second values of critical field, $H_{c,1}$ and $H_{c,2}$ in which field penetration first occurs at the lowest value to result in pinned fields which persist to much higher $H_{c,2}$ levels. See, e.g., U.S. Pat. No. 4,797,386 of Gygorgy et al. and M. Tinkham, Introduction to Superconductivity, Chapter 5, page 143 (McGraw-Hill, Inc., 1975), the disclosures of which are hereby incorporated by reference into this specification.

In one preferred embodiment of both this patent application and U.S. Pat. No. 4,960,760, the superconductor material used in the invention have specified $H_{c,1}$ and $H_{c,2}$ properties. The $H_{c,1}$ of these preferred materials is from about 10 to about 100 Gauss. The $H_{c,2}$ of these materials is from about 30 to about 100 Telsa. The second value of the critical field of the superconductor material is generally at least about 10,000 times as great as the first value of the critical field of the material.

High-temperature superconductors which may be used in the invention are described in an article by A. W. Sleight entitled "Chemistry of High-Temperature Superconductors," Science, Volume 242 (Dec. 16, 1988) at pages 1519–1527, the disclosure of which is hereby incorporated by reference into this specification.

One preferred class of superconductors, described on pages 1522–1523 of the Sleight article, is of the formula R $Ba_2Cu_3O_{6+x}$, wherein x is from about 0.5 to about 1.0 and R is a rare earth element selected from the group consisting of yttrium, gadolinium, lanthanum, europium, holmnium, and the like. In one preferred embodiment, R is yttrium.

Another preferred class of superconducting materials is of the formula $(AO)_m M_2 Ca_{n-1} Cu_n O_{2n+2}$, wherein A is selected from the group consisting of thallium, bismuth, and mixtures of bismuth and lead, m is from about 1 to about 2 (and generally is 1 or 2 when A is thallium and is 2 when A is bismuth), M is selected from the group consisting of barium and strontium, and n is at least 1. In one preferred embodiment, illustrated on page 1523 of the Sleight article, A is thallium, m is 2, M is barium, and n is 3; this composition has a critical temperature of about 122 degrees Kelvin.

The superconductor used in U.S. Pat. No. 4,960,760 and this invention, when tested in accordance with a specified test, will preferably have a specified levitation height. As is known to those skilled in the art, superconducting materials exhibit the "Meissner effect," which is the exclusion of a magnetic field from a superconductor. See, e.g., M. Tinkham's "Introduction to Superconductivity," supra.

As is known to those skilled in the art, levitation height may be calculated from the Hellman equation described in column 4 of U.S. Pat. No. 4,960,760. Reference may be had to an article by F. Hellman et al. entitled "Levitation of a magnet over a flat type II superconductor" (Journal of Applied Physics, 63 (2), Jan. 15, 1988), the disclosure of which is hereby incorporated by reference into this specification.

In the levitation height test used, which determines the levitation height obtained by a specified magnet with the superconductor material to be tested, one uses a specified rare earth cobalt magnet (obtained from the Edmund Scientific Company) which had a residual magnetic induction of 8200 gauss, a mass of 0.54 grams, a length of 0.89 centimeters, a width of 0.48 centimeters, and a height of 0.34 centimeters is used. In this test, the superconducting material is formed into a flat disc with a thickness of about 0.5 centimeter and a diameter of about 3 centimeters.

The levitation height obtained with the superconductor flat disc which is tested in accordance with this procedure is preferably at least about 0.7 centimeters and, in an even more preferred embodiment, is at least 1.6 centimeters.

If the procedure is changed to vary, e.g., the thickness of the superconducting disc, the density of the levitating object, or other parameters described in the aforementioned formula, different levitation heights will result with the same superconductive material. Thus, two levitation heights parameters are used to define applicants' system. One, the levitation height obtained with the superconductor material in the form of the specified flat disc, is determined in accordance with the aforementioned test. The second, the levitation height actually obtained in applicants' mass transfer system (which often will have superconductors with dimensions different than the disc used in the first test), may be estimated by the aforementioned Hellman equation; however, the precise levitation height must be measured during operation of the system. Such measurement may be made by cooling the superconducting chamber to a temperature below the critical temperature of the superconducting material in the chamber, inserting the magnetized object in the center of the chamber, and measuring the distance from the inner surface of the chamber to the center of the magnetized object being levitated. In general, in applicants' system, the levitation height of the system must be at least about 0.1 centimeters.

When reference is made to the levitation height hereafter, it will be understood that the levitation height of the system is being discussed and that, unlike the first levitation height parameter (which relates a height achieved in an open system), the height is obtained in a symmetrical chamber.

In the remainder of this specification, the first levitation height parameter will be referred to as the levitation height of the superconductor; and the second levitation height parameter will be referred to as the levitation height of the system.

In one embodiment, the levitation height of the system may be increased by doping superconductor material with silver. In general, from about 0.1 to about 10 weight percent (by total weight of superconducting material and silver) of silver or silver source is added. One may add pure, elemental silver. It is preferred, however, to add the silver in the form of a silver compound such as silver oxide, silver dioxide, and the like. The addition of the silver dopant to the superconducting material is believed to increase its critical current; see, e.g., Tinkam's "Introduction to Superconductivity," supra.

In one preferred embodiment, the superconducting material is configured so as to maximize the stability of the magnetic object levitating within it. The stability of magnets levitated above superconductors depends upon several factors such as the flux penetration and the pinning effects. See, e.g., an article by L. C. Davis et al. entitled "Stability of magnets levitated above superconductors," Journal of Applied Physics, 64 (8), Oct. 15, 1988, the disclosure of which is hereby incorporated by reference into this specification.

The pinning force exerted by the magnetized object upon the superconductive chamber may be estimated by the following formula of Davis:

$$F_D = 5LU_0(H_{max})^3 / 24 J_c.$$

wherein $F_D$ is the pinning force (in Newtons), L is the levitation height of the system (in meters), $U_O$ is the magnetic permeability of free space (in tesla-meters-/ampere), $H_{max}$ is the maximum magnetic field (in amperes/meter), and $J_c$ is the critical current of the superconductor material (in amperes/-square meter). Reference may be had to L. C. Davis et al.'s "Stability of magnets levitated above superconductors," page 4212, supra.

In one preferred embodiment of U.S. Pat. No. 4,960,760 (and of this application), in order to maximize stability, a superconducting material 14 (see said patent) is formed into a hollow, symmetrical chamber. As used in this specification, the term symmetrical chamber refers to a chamber whose interior surfaces define a symmetrical shape. Thus, by way of illustration and not limitation, material 14 can be formed in the shape whose interior dimensions define a circular cross section; in this embodiment, the exterior dimensions of the body may define a circular cross section, a square cross-section, an irregular cross-section, and the like. Thus, e.g., material 14 of such patent can be formed in a shape whose interior dimensions define a square; the exterior shape of this chamber may be circular, square, or of an irregular shape, etc. Thus, the interior shape of the chamber of such patent may be triangular, pentagonal, hexagonal, heptagonal, octagonal, etc.

Two preferred shapes which may be used for the chamber of this invention are shown as elements 14 and 72 in FIGS. 5, 5A, 6A and 6 of U.S. Pat. No. 4,960,760. In these embodiments, it is preferred to control the internal height of the chamber. In the case of the cylinder, such internal height is its internal diameter. In the case of the square, such internal height is the distance between two opposing internal surfaces. With other shapes, the internal height is the distance from the bottom to the top of the shape.

In one preferred embodiment, the levitation height of the superconductive material is greater than the internal height of the symmetrical chamber.

In one preferred embodiment, the superconductor used in the invention is of the formula $Y\ Ba_2Cu_3O_{7-x}$, the well known 1-2-3 superconducting phase. This superconducting material can be prepared by a solid state reaction method. Stoichiometric amounts of yttrium oxide, barium carbonate, and copper oxide are intimately mixed and ground, and the powder is then calcined in a special calcination cycle.

In one preferred calcination cycle, the material is first raised from ambient temperature to a temperature of from about 900 to about 960 degrees centigrade at a rate of from about 100 to about 400 degrees centigrade per hour. It is preferred to raise the temperature of the material from ambient temperature to a temperature of from about 910 to about 930 degrees centigrade at the rate of from about 275 to about 325 degrees centigrade per hour. Once the material reaches the temperature of from 900 to 960 degrees centigrade, it is maintained at this temperature for from about 10 to about 15 hours. Thereafter, its temperature is reduced to ambient at a rate of about from about 100 to about 400 degrees per hour.

The cooled calcined material is then ground until substantially all of its particles are smaller that 53 microns, and then the entire calcination/grinding cycle may be repeated one or more times.

It will be apparent to those skilled in the art that other calcination/grinding cycles which improve the homogeneity of the powder batch also may be used.

Without wishing to be bound to any particular theory, applicants believe that the use of the grinding/calcination cycle produces a superconductor with a pure phase. Shaped objects made from material thus processed are less brittle.

Any conventional means may be used to prepare the shaped objects. Thus, for example, one may use the forming processes described in James S. Reed's "Introduction to the Principles of Ceramic Processing," (John Wiley and Sons, Inc., New York, 1988), the disclosure of which is hereby incorporated by reference into this specification.

In one preferred embodiment, the calcined powder is formed into a shaped object by pressing. The pressing techniques described at pages 329-355 of said Reed book may be used. In general, in this embodiment, it is preferred to use a pressing pressure of from about 10 thousand to about 25 thousand pounds per square inch. In a more preferred embodiment, the pressure used is from about 15,000 to about 20,000 pounds per square inch. In general, this pressure is applied to the powder for at least about 2 minutes and, preferably, from about 4 to about 10 minutes. With the Yttrium-Barium-Copper 1-2-3 calcined powder described above, a pressing time of from about 5 to about 7 minutes and a pressure of about 15,000 p.s.i. is suitable.

The pressed body is then preferably sintered under specified conditions to yield a sintered body with substantially no internal deformation. A unique sintering cycle is utilized for this purpose. During this entire sintering and annealing cycle, the pressed body is maintained under a flowing oxygen-containing gas preferably at a pressure of at least about 1 atmosphere, and it is flowed over the pressed shape(s) at a rate of from 0.1 to about 10 cubic centimeters per minute.

It is preferred to raise the temperature of the formed body from ambient to a temperature of from about 920 to about 950 degrees centigrade at a rate of less than about 400 degrees centigrade per hour while the pressed body is under a flowing, oxygen-containing gas. It is more preferred to raise the temperature of the body from ambient to a temperature of from about 920 to about 930 degrees centigrade at a rate of less than about 300 degrees centigrade per hour.

Once the pressed body has reached the sintering temperature, it is maintained at this temperature under flowing oxygen-containing gas for at least about 20 hours. It is preferred to maintain the body at this temperature for from about 22 to about 26 hours. In one embodiment, the pressed body is maintained under these conditions for about 24 hours.

After the pressed body has been sintered under the aforementioned conditions, it is then cooled to a temperature of from about 600 to about 660 degrees centigrade at a rate of less than about 100 degrees centigrade per hour while under said flowing oxygen-containing gas. In one preferred embodiment, the sintered body is cooled to a temperature of from about 640 to about 660 degrees centigrade at a rate of from about 90 to about 100 degrees centigrade per hour.

After the sintered body has been cooled to a temperature of from about 600 to about 660 degrees centigrade, it is annealed at this temperature while under said flowing oxygen-containing gas for at least about 5 hours and, preferably, from about 5.5 to about 7.5 hours.

In the embodiment involving the 1-2-3 superconducting phase of yttrium/barium/copper, described above, the superconducting orthorhombic phase $Y_1Ba_2Cu_3O_{7-x}(x=0-0.5)$ is formed during this annealing process. In one embodiment, during the annealing process, samples of the annealed material are periodically withdrawn and subjected to X-ray diffraction analysis to determine the phase purity. When the desired amount and type of the superconducting phase has been formed, the annealing process may be ended.

After the material has been annealed, it is then cooled to ambient temperature; it is preferred, though not essential, that this cooling step occur under flowing oxygen-containing gas. The cooling to ambient temperature occurs at a rate of less than about 300 degrees centigrade per hour.

In another preferred embodiment, the superconducting cylindrical sections are formed by a process in which the 1-2-3 superconducting powder is calcined and sintered and, thereafter, the sintered powder is mixed with epoxy resin and molded to a desired shape. This technique is described in the M.S. thesis of Raymond C. Ward III which is entitled "Small Ceramic Superconducting Motors...," Alfred University, 1990.

The apparatus of the invention described in U.S. Pat. No. 4,960,760 (and of the invention of this patent application) is comprised of means for generating an electromagnetic field. Any of the means for generating such a field may be used. Thus, for example, one may use a direct current passing through a conductor to generate an electromagnetic field.

In one preferred embodiment, means 16 (see the Figures of U.S. Pat. No. 4,960,760) is comprised of a symmetrical coil whose interior preferably will have substantially the same shape as the shape of the interior of the superconducting chamber; as long as the shape of the interior of the coil is symmetrical, its exterior may (but need not) have a nonsymmetrical shape. Thus, by way of illustration, the interior of the coil may define a circular cross-section and the exterior of the coil may define an irregular cross-section. Thus, in one preferred embodiment, both the interior and exterior portions of the coil define a circular shape. In another preferred embodiment, the interior and exterior surfaces of the coil are both square. See, for example, FIGS. 1, 8, 10 and 11 of U.S. Pat. No. 4,960,760.

It is preferred to use coils in the apparatus of this invention (and of the device of said patent) which, regardless of their shape, are substantially symmetrical and have a center line from which all of the interior surfaces of the coil are substantially equidistant. Thus, for example, the coil may be in the shape of a cylinder or a square; and the magnetic projectile will levitate by Meissner effect along about the center line of said coil.

Any of the coils known to those skilled in the art may be used in the invention of said patent and/or this application; and any of the materials conventionally used in such coils also may be utilized. Thus, one may use copper wire, silver wire, or superconducting wire. As is known to those skilled in the art, superconducting wire may be made out of any of the superconducting materials. See, for example, U.S. Pat. No. 4,796,511 of Eyssa, the disclosure of which is hereby incorporated by reference into this specification.

In one preferred embodiment, wherein copper or silver wire is used, it is preferred that the gauge of the wire be from about 10 to about 40. As is known to those skilled in the art, the gauge of a wire conductor is specified as "American Wire Gauge Conductor Series"; and a AWG number 26, e.g., refers to 26 gauge wire. A table describing the AWG conductor series appears, e.g., on page 766 of Herbert W. Jackson's "Introduction to Electric Circuits," Sixth Edition (Prentice Hall, Englewood Cliffs, N.J., 1986).

It is preferred that one use a wire conventionally referred to as "magnet wire" with a gauge of from about 20 to about 30; see, e.g., page 793 of catalog 110 of Newark Electronic, Chicago, Ill.

For the embodiment illustrated in FIG. 1 of U.S. Pat. No. 4,960,760, it is preferred that the gauge of the wire in the coils be from about 20 to about 30 and, more preferably, be from about 25 to about 27.

Each electromagnetic coil used in applicants' system preferably has a thickness no greater than the gap which occurs between adjacent superconducting portions of the superconducting chamber. As will be seen by reference to FIG. 1 of U.S. Pat. No. 4,960,760, the superconducting chamber in which the magnetized object is levitated is preferably comprised of alternating sections of superconducting material and electromagnetic coils. Thus, the portion of the device shown in FIG. 1 of such patent illustrates, from left to right, a superconducting cylindrical portion 14, an electromagnetic coil 24, a second superconducting cylindrical portion, a second electromagnetic coil 26, and a third superconducting portion. The superconducting portions are separated by an air gap which is filled by an electromagnetic coil.

The gap between adjacent superconducting cylindrical portions should be no greater in width than the levitation height of the system defined above. Thus electromagnetic coils fit within said gaps and are preferably contiguous with the superconducting cylindrical portions on each side of them.

In one preferred embodiment, the internal diameter of the electromagnetic coil is substantially identical to the internal diameters of the superconducting cylindrical portions to which said coils are immediately adjacent and contiguous to; and the external diameters of said electromagnetic coils are substantially identical to the outside diameters of said superconducting cylindrical portions. In one embodiment, each of the superconducting cylindrical portions in the chamber and each of the electromagnetic coils will have the same internal diameter and the same outside diameter.

The length of any one of the cylindrical superconducting elements may be the same as or different than the length of any of the other of the superconducting elements; and the width of any one of the electromagnetic coils may be the same as or different from the width of any of the other of the electromagnetic coils. It is preferred to have at least two of said superconducting cylindrical elements and at least two coils in the device of this invention. In one preferred embodiment, each of the electromagnetic coils will have a different width, a different number of turns, and thus a different magnetic field produced by a specified current from each other.

In the device of this application (and of U.S. Pat. No. 4,960,760), the means of generating an electromagnetic field, in addition to said electromagnetic coils, also includes connecting leads from a current source. The current delivered to any one coil may be the same, or different, from the current delivered to any other coil.

The coil(s) used in the apparatus of this invention may be coated by a non-magnetic insulating binder the wire coil may be immersed in a rubber cement, epoxy resin, silicone rubber, and other insulating coatings; see, e.g., Brady and Clauser's "Materials Handbook", Twelfth Edition (McGraw-Hill Inc., New York). Thus, referring to page 883 of the Newark Electronics catalog 110, one may use Q-dope, Corona-Dope, Red-X Corona dope (a thixotropic, polyester-based red enamel), Red-Glypt Insulating Varnish (an alkyd-based compound), and the like.

Direct current is delivered to the coils of the apparatus of the invention. As used in this specification, direct current refers to current which flows in only one direction through a circuit and has a substantially constant amplitude during a given time period. Thus, this term excludes "pulsating direct current."

The electromagnetic force created in any one coil by the direct current may be calculated by means well known to those skilled in the art. Thus, for example, one may use the equation 11.5 described on page 385 of G. P. Harnwell's "Principles of Electricity and Electromagnetism," Second Edition (McGraw-Hill Book Company, New York 1949). This equation 11.5 is described at column 10 of U.S. Pat No. 4,960,760.

One means of providing a sufficient amount of electromagnetic energy to the system is illustrated in FIG. 1 of U.S. Pat. No. 4,960,760. Referring to FIG. 1, means for delivering direct current 28 is comprised of power supply 30, controller 32, power transistor 34, leads 36, and coils 24 and 26.

The power supply 30, the controller 32, and the power transistor 34 provide only one means of delivering intermittent direct current to coil 24. As will be apparent to those skilled in the art, other such means can be used. See, for example, the disclosure appearing at columns 10 through 12 of said U.S. Pat. No. 4,960,760.

Figures 4, 5, 6:
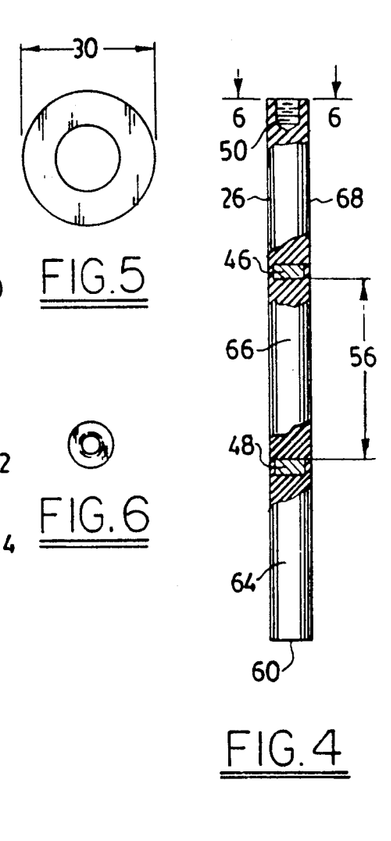
FIG. 4 is a perspective view of the piston used in the embodiment of FIG. 1.
FIG. 5 is an end view of the embodiment of FIG. 3.
FIG. 6 is an end view of the piston of FIG. 4.

One preferred superconductive chamber is illustrated in FIG. 5 of U.S. Pat. No. 4,960,760. Referring to such FIG. 5, the internal diameter 63 of the chamber is 1.20 centimeters, and the external diameter 67 is 2.54 centimeters. It will be appreciated that other chambers whose internal and external diameters are in the same ratio also may be used. Thus, e.g., if the internal and external diameters are 1.20 and 2.54 feet, respectively, the device may still be used.

Referring again to U.S. Pat. No. 4,960,760, FIG. 5A is a front view of the apparatus of FIG. 5, partially broken away to show the interior of the device. The length 65 of cylinder 40 may be from about 1 to about 10 centimeters and, in one embodiment, is 3.5 centimeters.

FIG. 6 of U.S. Pat. No. 4,960,760 illustrates one square, superconductive plate 64 which may be used to prepare a square chamber 72 shown in FIG. 6A.

Referring to FIG. 6 of such patent, one preferred embodiment of plate 64 is shown. This preferred embodiment has a length 66 of 2.54 centimeters, a length 68 of 2.54 centimeters, and a width 70 of 1.34 centimeters. It may be connected with three other plates 64 to prepare square chamber 72. See FIG. 6A.

Conventional means may be used to connect plates 64 to each other. Thus, by way of illustration, one may use an epoxy resin adhesive. As is known to those skilled in the art, epoxy resins have in their molecules a highly reactive oxirane ring. One preferred epoxy resin adhesive useful for joining plates 64 together is "1266 Epoxy A and B" which is manufactured by the Emerson and Cuming Company of Massachusetts and is sold by Dean Co. Ithaca, N.Y.

FIG. 9 of U.S. Pat. No. 4,960,760 illustrates the forces between a magnetized object and the coil. If the field of the coil closest to the north pole of the magnetized object is a south pole, it will attract object 38; and it will repel it if it is a south pole. As is known to those in the art, the field of the coil will vary with the direction of the current flow in accordance with the right hand rule.

The coil in FIG. 9 of U.S. Pat. No. 4,960,760 is in the shape of a cylinder and has substantially the same shape as that of the superconducting chamber material. If, however, the shape of chamber material is of another shape, like a square shape, e.g., a coil which has a substantially square shape should be used. It is preferred that the interior shape of the coil substantially match the interior shape of the chamber.

DESCRIPTION OF THE EMBODIMENTS OF THE DRAWINGS

A preferred embodiment of applicants' invention is illustrated in FIG. 1 of this case. Referring to FIG. 1, it will be seen that shock absorber 10 is comprised of chamber 11, cap 12, and piston 26. Chamber 11 is comprised chamber housing 14. Chamber housing 14 is preferably comprised of at least a first superconductive portion 16, a first electromagnetic coil 18, a second superconductive portion 20, a second electromagnetic coil 22, and a third superconductive portion 24. The shock absorber 10 is comprised of a piston 26.

Superconductive portions 16, 20, and 24 preferably consist essentially of the High Tc superconductive material described elsewhere in this specification; a process for producing this bulk device is described in U.S. Pat. No. 4,960,760. Alternatively, one or more of these superconductive portions may be formed by coating a superconductive ceramic material onto a shaped substrate.

In one preferred embodiment, chamber 11 is formed by coating a high Tc superconductive material onto a shaped substrate. It is known that ceramic materials may be fabricated into film by evaporation or by sputtering methods; however, both of these methods are usually conducted under vacuum. See, e.g., B. Oh et al., "Critical current densities and transport in superconducting YBaCuO films made by electron beam co-evaporation," Applied Physics Letters 51, 852 (1987); M. Hong et al., "Superconducting Y-Ba-Cu-O oxide films by sputtering," Applied Physics Letters 51, 694 (1987); D. Dijkkamp et al., "Preparation of Y-Ba-Cu oxide superconductor thin films using pulsed laser evaporation from high Tc bulk material," Applied Physics Letters 51, 619 (1987); and S. Witanachchi et al., "Deposition of superconducting Y-Ba-Cu-O films at 400 degrees centrigrade without postannealing," Applied Physics Letters 53, 234 (1988).

Housing 14 is preferably cylindrical, although it could take other substantially symmetrical shapes. Thus, by way of illustration, housing 14 could be square, triangular, hexagonal, octagonal, and the like.

In the preferred embodiment, wherein housing 14 is cylindrical, the housing preferably has an outside diameter 30 of from about 1 millimeter to about 50 centimeters. It is preferred that outside diameter 30 be from about 1 to about 20 centimeters. It is even more preferred that outside diameter 30 be from about 2 to about 10 centimeters.

As will be apparent to those skilled in the art, when a Type II metallic superconductor is used, the cooling means must be adequate to cool the chamber to below the critical temperature of the superconductor used. Thus, e.g., one may use the low-temperature liquids described on pages 626-629 of Volume 3 of the "McGraw-Hill Encyclopedia of Science & Technology" (McGraw-Hill Book Company, New York, 1977), the disclosure of which is hereby incorporated by reference into this specification. Thus, for example, liquid helium (4.2 degrees Kelvin) or liquid hydrogen (14 degrees Kelvin) may be used to cool some of these superconductors.

Conventional low temperature refrigeration devices may be used in conjunction with the low-temperature liquid(s). Thus, one may use the ultra-low temperature or low temperature refrigerators obtainable from Cryogenic Consultants, Ltd of 231 The Vale, London, England. Thus, one may purchase such a refrigerator from Janis Research Company, Inc. of 2 Jewel Drive, Wilmington, Mass. Thus, one may purchase such a refrigeration unit from Oxford Instruments of North America, 3A Alfred Circle, Bedford, Mass.

In one preferred embodiment, a substrate in the desired shape of a chamber is coated with superconductive material. It is preferred that a relatively thick film of superconductive material greater than 0.1 micron and, preferably, on the order of from about 1 to about 100 microns, be coated onto the substrate.

The chamber substrate may be coated with superconductive films prepared by a plasma evaporation technique. See, for example, the article by M. Sayer et al. entitled "Ceramic Thin Films: Fabrication and Applications," Science, Volume 247, Mar. 2, 1990, pages 1056 to 1060. Reference also may be had to an article by X. W. Wang et al. entitled "Superconducting $Y_1Ba_2Cu_3O_{7-x}$ Films by RF Plasma Aerosol Evaporation at Atmospheric Pressure," published in the Proceedings of the Conference on the Science and Technology of Thin-Film Superconductors," held Apr. 30-May 4, 1990 at Denver, Colo.

It is known that superconductive films with thicknesses in excess of 100 microns may be prepared by a tape-casting process. See, e.g., M. Ishii et al., "Fabrication of superconducting YBaCuO films by a tape casting method," Japanese Applied Physics 26, L1959 (1987).

A thick film printing technique can be utilized to prepare a film. See, e.g. P. Moran's "Hybrid Microelectronic Technology," Electrocomponent science monograms, volume 4 (Gordon and Breach Science Publishers, New York, 1984).

Many other references disclose the preparation of films of superconductive material. See, e.g., (1)H.S. Kwok et al., "Laser evaporation deposition of superconducting and dielectric thin films," Applied Physics Letters, Volume 52 (21), May 23, 1988; (2)S. Witanachchi et al., "Laser Deposition of Superconducting and Semiconducting Thin Films," in "Superconductivity and its Applications," edited by H. S. Kwok et al. (Elsevier Company, New York, 1988), at pages 194 et seq. The disclosure of each of these publications is hereby incorporated by reference into this specification.

The substrate onto which the superconductor is to be coated may be any substrate which are commonly used with superconductive films. Thus, the substrate may comprise nickel, sapphire, copper, and the like. In one embodiment, a buffer layer magnesia is interposed between the substrate and the superconductive coating. In another embodiment, the buffer layer is cubic zirconia.

By way of illustration, one may use any of the substrates mentioned in M. Sayer's "Ceramic Thin Films . . ." article, supra. Alternatively, one may use one or more of the substrates described on page 286 of "Superconducting Devices," edited by S. T. Ruggiero et al. (Academic Press, Inc., Boston, 1990). The disclosure of these publications is hereby incorporated by reference into this specification.

Referring again to FIG. 1, it will be seen that shock absorber 10 is comprised of a means 32 and 34 for attaching the shock absorber to fixed surfaces. Means 32, which preferably is an integral part of cap 12, may be used to attach chamber 11 to a fixed surface. Means 34, which preferably is an integral part of piston 26, may be used to attach piston 26 to a fixed surface.

The length 36 of chamber 11 preferably will range from about 2 to about 100 centimeters and, even more preferably, be from about 5 to about 50 centimeters. In an even more preferred embodiment, length 36 is from about 10 to about 20 centimeters.

It is preferred that the ratio of length 36 to diameter 30 is from about 1:1 to about 10:1.

Coil 18 is provided with electrical leads 42 and 44. Coil 22 is provided with electrical leads 38 and 40. Current may be provided to these leads to cause a magnetic field to be created around coils 18 and 22. As is well known to those skilled in the art, the amount of direct current furnished to said electrical leads will control the strength of the magnetic field surrounding coils 18 and/or 22. Furthermore, the direction of the current furnished to said electrical leads will determine the direction of the electromagnetic field formed around coils 18 and 22.

Figure 2:
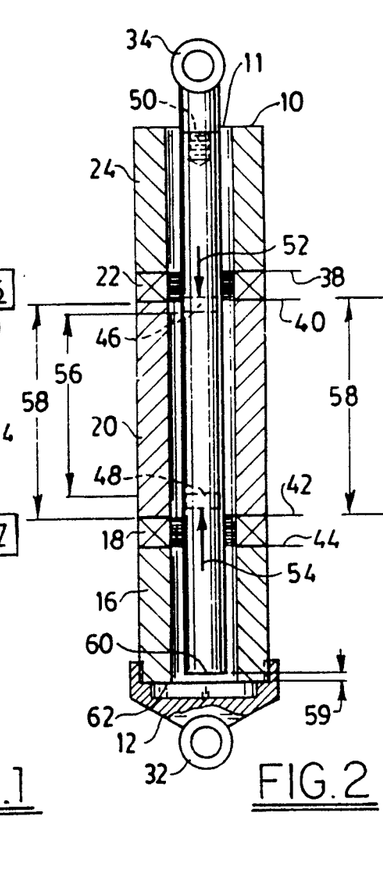
FIG. 2 is a sectional view of the embodiment of FIG. 1, with the piston of said embodiment disposed within the cylinder of the device.

FIG. 2 is a sectional view of the preferred embodiment of FIG. 1, illustrating piston 26 disposed within chamber 11. As will be seen by reference to FIG. 2, piston 26 is comprised of at least two magnets 46 and 48.

Referring to FIG. 2, it will be seen that means 34 for attaching piston 26 to a fixed surface may be secured to piston 26 by conventional means. Thus, as is illustrated in FIG. 2, said means 34 may be screwed into an appropriate threaded receptacle 50 of piston 26. Alternatively, said means 34 may be adhesively joined to piston 26.

As will be apparent to those skilled in the art, there will be an interaction between the electromagnetic fields created around coils 18 and 22 and the magnetic fields around permanent magnets 46 and 48. By choosing the appropriate current flow direction for the wound coils 18 and 22, and the polarity of the magnets 46 and 48, one may insure that piston 26 will tend to stay in a fixed position vis-a-vis coils 18 and 22.

In one preferred embodiment, illustrated in FIG. 2, the force created between the electromagnetic field of coil 22 and the magnetic field of magnet 46 will be exerted in the direction of arrow 52; and the force created between the electromagnetic field of coil 18 and the magnetic field of magnet 48 will be exerted in the direction of arrow 54. In this embodiment, piston 26 will tend to stay disposed in the center of chamber 11. Because of the "Meissner effect," discussed elsewhere in this specification, the piston 26 will tend stay away from the interior surfaces of superconductive chamber 11. Thus, in this embodiment, there are at least three separate forces tending to insure that piston 26 remains disposed in substantially one position within chamber 11. Applicants' shock absorber 10 thus contains a first means for maintaining piston 26 substantially at a fixed position within chamber 11, and second means for maintaining piston 26 substantially at a fixed position within chamber 11.

In the embodiment illustrated in FIG. 2, the distance 56 between magnets 46 and 48 is less than the distance 58 between coils 18 and 22. In another embodiment, not shown, the distance 56 is equal to or greater than the distance 58. It will be appreciated by those skilled in the art that, by varying the distance 56 and 58 and their ratio, the extent to which piston 26 is free to travel also may be varied.

It will be appreciated by those skilled in the art that shock absorber 10 may be disposed so that gravity is acting upon piston 26 in the direction of arrow 52, or in the direction of arrow 54, or in any intermediate direction. When the shock absorber 10 is disposed so that gravity acts upon piston 26 in the direction of arrow 52, one may choose to balance the effect of gravity by several conventional means. One such means is to provide a greater current to coil 18 than is provided to coil 22. Another such means is to adjust the current flow to coil 22 so that the force exerted between magnet 46 and coil 22 is acting in the direction of arrow 54. Many other possible configurations, or combinations, which yield a stable device, will be apparent to those skilled in the art.

In one preferred embodiment, not shown, magnet 48 is located at the substantial centerpoint of the length 58, and magnet 46 is located above coil 22. In this embodiment, the magnets are so disposed and/or the current to the coils 18 and 22 are so directed, that the net force on piston 26 will maintain such piston within the center of chamber 11. As is known to those skilled in the art, force varies with distance, and by choosing the appropriate distance between the magnets and the coils, one may adjust the competing forces on piston 26 in such a manner that the piston is maintained within the cylinder at any specified desired point. If any external vibration or shock tends to move the piston from the desired balance point, the combined forces of the magnets and-/or electromagnets and/or gravity will tend to return the piston back to its original position.

In one embodiment, shock absorber 10 is provided with an adjustable means (not shown) for varying the amount of current and/or the direction of the current provided to leads 38, 40, 42, and 44. Thus, applicants' novel shock absorber, in this embodiment, contains means for changing its desired position; and it also contains means for varying the resistance of the shock absorber to displacement of piston 26.

The distance 59 between the bottom 60 of piston 26 and the top surface 62 may be varied, as indicated above, by varying the placement of magnets 46 and 48, and/or varying the polarity of magnets 46 and/or 48, and/or varying the direction of the current supplied to coils 18 and/or 22, and/or varying the strength of the current supplied to coils 18 and/or 22, and/or varying the length of piston 26. In some embodiments, it will be desired to have piston contact surface 62; in other embodiments, said contact will preferably be avoided.

In one preferred embodiment, because of the suitable combination of gravity, the Meissner effect, the forces between the electromagnets and the magnets, and the manner in which shock absorber 10 is disposed, piston 26 is disposed within chamber 11 in such a manner that none of its surfaces contact any of the interior surfaces of chamber 11. Thus, the frictionless mode of operation tends to lengthen the service life of shock absorber 10. This mode of operation is hereinafter referred to as "contactless."

In one embodiment, not shown, in addition to magnets 46 and 48, at least one additional magnet is disposed within piston 26 in order to enhance the Meissner effect. In another embodiment, at least two of said additional magnets are disposed within piston 26, preferably near the ends of such piston 26, to enhance the Meissner effect and/or to further interact with electromagnetic fields created by coils 18 and 22.

In the embodiment illustrated in FIG. 2, a device with superconductive cylinders 16, 20, and 24 is illustrated. It will be appreciated by those skilled in the art that, in other embodiments, one may dispose with the use of superconductive chamber 16.

Figure 3:
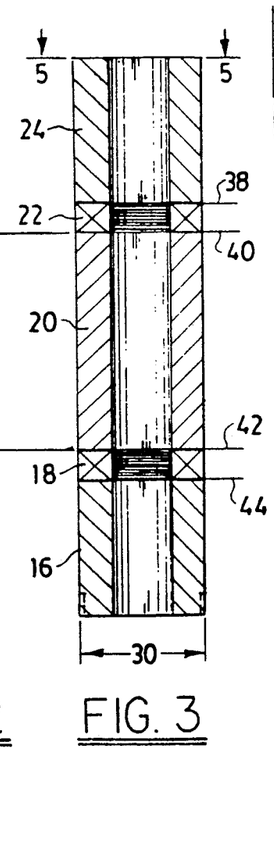
FIG. 3 is a partial sectional view of the embodiment of FIG. 1, without the piston being disposed within the cylinder.

FIG. 3 is a cross-sectional view of the chamber 11 of FIG. 1. FIG. 5 is an end view of the chamber 11 of FIG. 3, taken along lines 5—5.

FIG. 4 is a partial sectional view of the piston 26 of FIG. 2, showing how magnets 46 and 48 are disposed within said piston. FIG. 6 is an end view of the piston 26 of FIG. 4, taken along lines 6—6.

Referring to FIG. 4, it will be seen that piston 26 is comprised of nonmagnetic section 64, magnet 48, nonmagnetic section 66, magnet 46, and nonmagnetic section 68. The piston 26 is preferably an integral assembly.

Although the piston 26 depicted in FIG. 4 has three nonmagnetic sections and two magnetic sections, one may have an embodiment in which nonmagnetic section 64 is disposed of.

Any conventional means for preparing a rod comprised of at least two nonmagnetic sections and at least two magnetic sections may be used to prepare piston 26.

In one embodiment, not shown, piston 26 is prepared by a molding process. In this embodiment, a cylindrical mold is provided, and magnets 46 and 48 are disposed within said mold at their desired locations. Thereafter, the mold is then filled with a suitable material which can be caused to harden to a nonmagnetic solid and to enclose the magnets 46 and 48 within it. Any suitable, nonmagnetic moldable material may be used for this purpose. Thus, by way of illustration and not limitation, one may use "KEVLAR" (an aromatic polyamide material sold by the E. I. du Pont de Nemours & Company of Wilmington, Del.), glass, molten aluminum, molten copper, molten stainless steel, and the like. In one preferred embodiment, a thermoplastic material is used. These thermoplastic materials are described in the "Modern Plastics Encyclopedia 91," Modern Plastics, Mid-October 1990 issue, Volume 67, Number 11 (McGraw-Hill, Highstown, N.J.), the disclosure of which is hereby incorporated by reference into this specification.

In one embodiment, the molding material is comprised of epoxy resin which, optionally, may be reinforced. As is known to those skilled in the art, epoxy resins have in their molecules a highly reactive oxirane ring. See, e.g., pages 287–289 of George S. Brady et al.'s "Materials Handbook," Twelfth Edition (McGraw-Hill Company, New York, 1986), the disclosure of which is hereby incorporated by reference into this specification. One preferred epoxy resin which may be used is "1266 Epoxy A and B," which is manufactured by the Emerson and Cuming Company of Massachusetts and is sold by Dean Company of Ithaca, N.Y.

In one embodiment, piston 26 is prepared by using a fiberglass mat and resin which was purchased at MP&P Automotive, Bath, New York and was manufactured by the Marson Corporation of 130 Crescent Avenue, Chelsea, Mass. (part number 80952).

The following Examples are presented to illustrate the claimed invention but are not to be deemed limitative thereof; example 1 of this specification is substantially identical to example 1 of U.S. Pat. No. 4,960,760. Unless otherwise stated, all parts are by weight and all temperature are in degrees centigrade.

EXAMPLE 1

40.07 grams of yttrium oxide (obtained from Aldrich Chemical corporation, Milwaukee, Wis., catalog number 20,494-7, 1988-89 catalog), 139.84 grams of barium carbonate (catalog number 20,271-1, 1988-89 Aldrich catalog) and 85.34 grams of copper oxide (catalog number 32,545-7, 1988-89 Aldrich catalog) were mixed by hand with a mortar and pestle for about 5 minutes.

The ground powder mixture was then calcined in a lindberg box (muffle) furnace (model number 10,549-110C, available from the Fisher Scientific Company, Springfield, N.J., see page 539 of 1988 Fisher Catalog). The temperature of the mixture was raised from ambient temperature to a temperature of 920 degrees centigrade at a rate of 300 degrees centigrade per hour. Thereafter, the material was maintained at said temperature of 920 degrees centigrade for 12 hours. Thereafter, it was cooled from this temperature to ambient temperature at a rate of 300 degrees per hour.

The entire calcination cycle described above was repeated twice. Thereafter, the calcined material was ground in a mortar and pestle for about five minutes until substantially all of its particles were smaller than 53 microns.

The ground and calcined material was then pressed in a special die made from medium carbon rolled steel. This die was comprised of three parts. The first part was an internal, solid pin with a diameter of 1.195 centimeters and a length of 10 centimeters; this part was used to define the internal diameter of the superconducting chamber. The second part was a two-part middle cylinder with the same cross-sectional dimensions as the superconducting cylinder specified in FIGS. 5 and 5A of U.S. Pat. No. 4,960,760; one of such parts, the upper cylinder, had a length of 4 centimeter, and the other of such parts, the lower cylinder, had a length of 10.5 centimeters. The third part was a cylindrical outer housing with a length of 10 centimeters, and inside diameter of 2.545 centimeters, and an outside diameter of 5 centimeters.

The solid pin was inserted into the lower middle cylinder. These two pieces were then inserted into the outer housing cylinder. The empty space between the solid pin and outer housing was filled with the calcined material described above. Then the upper middle cylinder was applied to the top of the loose powder, and the powder was pressed under a pressure of 16,000 pounds and at ambient temperature for about 6 minutes. A stable cylindrical shape was produced with the dimensions and shape shown in FIGS. 5 and 5A of U.S. Pat. No. 4,960,760.

The cylinder so produced was sintered using the aforementioned Lingberg furnace under flowing oxygen for twenty-four hours. The oxygen flow rate used was 1 cubic centimeter per minute. The material was first raised from ambient to 920 degrees centigrade at a rate of 300 degrees per hour. Thereafter, it was maintained at 920 degrees centigrade for 24 hours, cooled to 650 degrees centigrade at a rate of 100 degrees per hour, maintained at 650 degrees centigrade for 6 hours, and cooled to ambient at a rate of 300 degrees centigrade per hour. The entire sintering cycle occurred under flowing oxygen.

The properties of the sintered cylinder were evaluated. The temperature of the superconducting transition, Tc, was evaluated in accordance with the procedure described in a paper by M. Pistakis and X. Wang, "Automated superconductor Measurements System," The Review of Scientific Instrum., 60(1), pages 135-136, January 1989, the disclosure of which is hereby incorporated by reference into this specification; a Keithly current source providing about 1 milliampere to the sample (model number 228A, Keithly Instrument Inc. Cleveland, Ohio) was used. A Keithly multimeter (model 195) was used as a voltmeter to measure the voltage drop across the superconducting sample due to the current. The resistance of the sample at a given temperature is equal to the voltage divided by the current. Another Keithly multimeter (model 196) was used as voltmeter for the thermocouple. The Tc of the material was 90 degrees Kelvin.

A portion (less than 1 gram) of the sintered cylinder was ground by mortar and pestle to produce powder whose particles were smaller than 53 microns; this powder was then subjected to Powder X-ray diffraction analysis on a Siemens D-500 Diffractometer (model number C72298-A223-B-9-POZ-288, manufactured by Siemens Company of West Germany) using copper K-alpha radiation and a diffracted beam graphite monochrometer. Analysis revealed a pure yttrium-barium-copper 1-2-3 phase.

EXAMPLE 2

Preparation of chamber 11

In substantial accordance with the procedure of Example 1, three cylindrical superconductive chambers were prepared. Each of these chambers had an outside diameter of 2.54 centimeters, an internal diameter of 1.2 centimeters. The first of said chambers (chamber 16) had a height of 2.6 centimeters. The second of said chambers (chamber 20) had a height of 4.2 centimeters. The third of said chambers (chamber 24) had a height of 2.8 centimeters.

A steel rod with a diameter of 1.18 centimeters and length of 30 centimeters was used to assemble the composite chamber. The first of the chambers was slid far enough onto said rod so that about 1.0 inch of the rod extended past the cylinder; and, once the chamber was so positioned, ¾ inch masking tape (manufactured by the Minnesota Mining and Manufacturing Company) was wrapped around the portion of the rod above the first chamber in several overlaying turns to keep the first chamber in place on the rod.

Thereafter, a first electromagnetic coil was made by wrapping AWG wire 26 (sold as "magnet wire, Belden Stock no. 36F1316, available from Newark Catalog #108 on page 683 thereof) around the steel rod until a coil which had a diameter slightly less than 2.54 centimeters and a height of about 0.6 centimeters was produced; about 150 turns were required to produce such a coil. During this coil wrapping procedure, G.E. "Silicone 2" sealant/adhesive was applied to the coil in sufficient amount that each coil winding was covered by the sealant. Care was taken to leave leads of lengths of about 10 centimeters extending from the coil.

The assembly was allowed to cure under ambient conditions for about 1.0 hour, after which the masking tape was removed. Thereafter, the second chamber was slid onto the steel rod until it was contiguous with the first coil and was about 6 millimeters away from the first chamber. The gap between the first and second chambers which existed because the diameter of the coil was slightly less than the diameter of the chambers was then filled with G.E. "SILICONE 2" adhesive/sealant, which was obtained from Newark Catalog 108 as Stock number 00z65 2. Thereafter, the assembly was allowed to cure for about 1.0 hour under ambient conditions.

A second coil with substantially the same dimensions of the first coil was then produced on the steel rod adjacent to the top of the second chamber; and one of the leads of the first coil was electrically connected to one of the leads of the second coil; the modified assembly, with the second coil in place, was then allowed to cure for about 1 hour under ambient conditions. Thereafter, in accordance with the aforementioned procedure, the third chamber was then slid upon the steel rod, and the gap between the second and third chambers was then also filled with said G.E. "Silicone 2."

After the assembly so produced had cured under ambient conditions for about 24 hours, it was wrapped with duct tape. This duct tape, in addition to giving the assembly structural integrity, prevents liquid nitrogen from seeping into the body of the assembly.

EXAMPLE 3

Preparation of piston 26

A piston assembly was prepared from a fiberglass mat and epoxy resin; the resin was purchased from MP&P Automotive of Bath New York; it had been manufactured (as part number 80952) by the Marson Corporation of Chelsea, Mass.

A mold was formed by emptying a BIC round stick pen; the ink cartridge was removed from the pen. The mold cavity so formed had a diameter of about 0.6 centimeters.

The epoxy resin and the fiberglass mat were mixed in accordance with directions provided by the manufacturer, and the mixture so formed was then forced into the empty outer casing of the BIC pen. The mixture was then allowed to cure for about 1 hour under ambient conditions. Thereafter, the pen case was removed from the core by slicing it lengthwise into two pieces and then removing each section.

The cured core was then cut into three sections. Two of the sections had a length of 3.2 centimeters. One of the sections had a length of 3.6 centimeters.

Neodymium—iron—boron magnets were purchased from the Edmund Scientific Company of Barrington, N.J. (Stock number R38,429, available in Edmund Catalog #11N1 [1991] at page number 150). These magnets had diameters of 6.35 millimeters and lengths of 3 millimeters, they had residual inductions of 8200 Gauss, and they had coercive forces of 7300 Oersteds.

In accordance with FIG. 1, the magnets and the core sections were placed so that a core section of 3.2 centimeters length was placed on the bottom, a magnet was then placed contiguous with it, a core section of 3.6 centimeters length was then placed in the middle, a second magnet was then placed contiguous with it, and a core section of 3.2 centimeters length was then placed on top of the second magnet. The magnets were so arranged that, going from bottom to top, they presented their north poles facing towards the bottom and their south poles facing towards the top.

This core/magnet assembly was then coated with a layer of the aforementioned fiberglass mat/epoxy resin composition; the diameter of the assembly so coated was approximately 2.0 centimeters.

The coated assembly was then allowed to cure for about 1 hour under ambient conditions. Thereafter, it was sanded with emery paper until the assembly so produced had a diameter of about 0.9 centimeters. During such sanding, care was taken to insure that said magnets remained centered within the assembly.

EXAMPLE 4

Preparation of cooling means

A cylindrical cooling assembly was constructed from a tin can; this tin can had a diameter of 8.5 centimeters, and a length of 13.5 centimeters.

Two styrofoam disks with diameters slightly less than 8.5 centimeters and with thicknesses of about 2.0 centimeters were cut from styrofoam; thereafter, one of these disks was glued to the top surface of the bottom of said can, and the other of said disks was glued to the bottom surface of the bottom of said can.

Thereafter, the tin can assembly was wrapped with 1.0 millimeter thick closed cell foam material until a layer which was about 2.0 centimeters thick of such foam insulation was built up around the perimeter of the can and the styrofoam disk. Thereafter, ¾ inch masking tape was wrapped around the closed-cell foam to keep it in place.

The chamber 11 produced in Example 2 was then glued to the styrofoam disk appearing on top of the top surface of the bottom of the tin can; the General Electric "Silicone 2" was applied to the bottom of the chamber 11, and the chamber 11 was then placed onto the styrofoam disk. The assembly so glued was then allowed to cure for about 1.0 hour under ambient conditions.

The piston 26 assembly was then disposed within the center of the chamber 11 assembly.

EXAMPLE 5

Connection of the power source

A Sorenson DCR 20-25 B, direct current power supply (manufactured by the Sorenson Company, a Division of Switchcraft, Inc. of Chicago, Ill., which is a division of Raytheon Company) was used as the power supply. A spring was used to provide a source of vibrations for the experiments; the spring was made by wrapping 45 turns of Belden #8052 24 AWG magnet wire around a steel rod with a diameter of 0.5 inch; the spring had a spring constant of about 3 Newtons per meter.

The spring was attached to the end 34 of the piston which was furthest from the styrofoam.

EXAMPLE 6

Evaluation of the damping effect

Liquid nitrogen was poured into the tin can assembly. Current was supplied by the power supply to the leads from the chamber 11. Vibrations in the piston 26 were induced by displacing the piston and allowing the spring to cause it to oscillate. The piston used in this experiment was weighed, and it was found to weigh about 9.8 grams. The oscillation of piston 26 was dampened.

A control experiment was conducted to determine how many oscillations would occur, when no power was supplied from the power source, before free oscillation of the piston stopped. In excess of 100 free such oscillations of the piston 26 occurred.

When a power of 0.5 watts was delivered from the power supply to the chamber 11, the piston ceased oscillating after 4 cycles.

When a power of 2.0 watts was delivered from the power supply to the chamber 11, the piston ceased oscillating after 3 cycles.

EXAMPLE 7

Evaluation of the loading effect

The procedure of Example 6 was substantially followed, with the exception that no spring was used.

The minimum amount of current delivered to the chamber 11 which was sufficient to cause the piston 26 to levitate within such chamber was determined; it was found to be 0.7 amperes.

A weight was added to piston 26 so that its total weight was 12.96 grams. The minimum amount of current needed to cause this weighted piston to levitate was 0.8 amperes.

At a weight of 16.1 grams, 1.0 ampere was required to cause levitation. At a weight of 22.39 grams, 1.8 amperes was needed to cause levitation. At a weight of 28.68 grams, 2.0 amperes was needed to cause levitation. At a weight of 34.97 grams, 2.5 amperes were needed to cause levitation. At a weight of 41.26 grams, 3.0 amperes were needed to cause levitation.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A contactless shock absorber assembly comprised of a chamber, means for supplying electrical current to said chamber, means for cooling said chamber, a piston disposed within said chamber, and means for damping the vibration of said piston, wherein:

(a) said chamber is formed by alternating superconductive sections comprised of superconductive material, and electromagnetic coils;
   (b) the interior surfaces of said chamber define a symmetrical shape;
   (c) said superconductive material has a first critical field value greater than about 10 Gauss and a second critical field value of greater than about 30 Tesla;
   (d) said chamber is comprised of at least two electromagnetic coils, each of which is contiguous with at least one of said superconductive sections; and
   (e) said piston is comprised of at least two nonmagnetic sections and at least two magnetic sections.

2. The contactless shock absorber assembly as recited in claim 1, wherein said assembly is comprised of means for varying the extend to which the vibration of said piston is damped.

3. The contactless shock absorber assembly as recited in claim 2, wherein said assembly is comprised of a cap attached to one end of said chamber.

4. The contactless shock absorber assembly as recited in claim 3, wherein said cap is comprised of means for attaching said cap to a fixed surface.

5. The contactless shock absorber assembly as recited in claim 2, wherein said nonmagnetic sections consist of nonmetallic material.

6. The contactless shock absorber assembly as recited in claim 5, wherein said nonmetallic material is comprised of epoxy resin.

7. The contactless shock absorber assembly as recited in claim 2, wherein said chamber is comprised of at least three sections of superconductive material.

8. The contactless shock absorber assembly as recited in claim 2, wherein said sections of superconductive material have a substantially circular shape.

9. The contactless shock absorber assembly as recited in claim 2, wherein said electromagnetic coils have a substantially circular shape.

10. The contactless shock absorber assembly as recited in claim 2, wherein said piston is comprised of at least three nonmagnetic sections.

11. The contactless shock absorber assembly as recited in claim 2, wherein said magnetic sections consist essentially of permanent magnets.

12. The contactless shock absorber assembly as recited in claim 2, wherein said piston is comprised of means for attaching said piston to a surface.

* * * * *